(12) United States Patent
Zave et al.

(10) Patent No.: US 6,829,346 B1
(45) Date of Patent: *Dec. 7, 2004

(54) ROUTING OPTIMIZATIONS FOR TELECOMMUNICATIONS NETWORK SYSTEM AND METHOD

(75) Inventors: Pamela Zave, Chatham, NJ (US); Michael A Jackson, London (GB); James Christopher Ramming, Palo Alto, CA (US)

(73) Assignee: AT&T Corp., New York, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 09/683,285

(22) Filed: Dec. 10, 2001

Related U.S. Application Data

(60) Provisional application No. 60/255,590, filed on Dec. 14, 2000.

(51) Int. Cl.[7] .................. H04M 3/42; H04M 7/00
(52) U.S. Cl. .................. 379/220.01; 379/201.05; 379/201.12
(58) Field of Search ............. 379/201.01, 201.02, 379/201.05, 201.12, 207.02, 219, 220.01, 221.13, 225, 229, 230, 901

(56) References Cited

U.S. PATENT DOCUMENTS

| | | | |
|---|---|---|---|
| 4,488,004 A | * 12/1984 | Bogart et al. | 379/225 |
| 5,583,929 A | * 12/1996 | Ardon | 379/230 |
| 6,160,883 A | * 12/2000 | Jackson et al. | 379/230 |
| 6,404,878 B1 | * 6/2002 | Jackson et al. | 379/221.01 |

* cited by examiner

Primary Examiner—Harry S. Hong

(57) ABSTRACT

A distributed features system is disclosed which permits a telecommunication network to efficiently distribute data related to network addresses.

11 Claims, 9 Drawing Sheets

Fig. 2

201 — [box, boxType, feature, symbol, customer, dataRelation, node]

202 —
LAddress: $\mathbb{P}$ address
TAddress: $\mathbb{P}$ address
RAddress: $\mathbb{P}$ address
MAddress: $\mathbb{P}$ address disjoint⟨LAddress,TAddress,RAddress,MAddress⟩

⟨⟩ ∈ address\(LAddress ∪ TAddress ∪ RAddress ∪ Maddress)

203 —
LMap: LAddress $\rightarrowtail\!\!\!\rightarrow$ LIBox
TMap: TAddress $\leftrightarrow$ TIBox
RMap: RAddress $\leftrightarrow$ RIBox 204 — boundTo: BFBox → (LAddress ∪ TAddress ∪ RAddress ∪ MAddress)

subscribes: address $\leftrightarrow$ (boxZone ⊳ {source,target})

dom subscribes = (LAddress ∪ TAddress ∪ RAddress ∪ MAddress)

205 — boxZone: FBoxType $\leftrightarrow$ zone dom boxZone = FBoxType (BFBoxType ⊲ boxZone ⊳ {dialed}) = ∅

Fig. 3

301 — $\forall n: node, \forall a: address \bullet n \in addrLoc\ (\{\{a\}\}) \Rightarrow$
the address slice of $a$ is located at $n$ 302 — $\forall a: address \bullet a \in ran\ boundTo \Rightarrow$
$boxSetLoc\ (\{boundTo\sim(\{\{a\}\})\}) = addrLoc\ (\{\{a\}\})$ 303 — $\forall a: address \bullet a \in ran\ boundTo \Rightarrow \#\ addrLoc\ (\{\{a\}\}) = 1$ 303 — $\forall n: node, \forall a: address, \forall b: FFBoxType \bullet n \in addrLoc\ (\{\{a\}\}) \land b \in dom\ subscribes\ (\{\{a\}\}) \Rightarrow$
boxes of type $b$ are available at $n$ $map == LMap \cup TMap \cup RMap$ 304 — $\forall a: address \bullet a \in (LAddress \cup TAddress \cup RAddress) \Rightarrow$
$boxSetLoc\ (\{map\ (\{\{a\}\})\}) = addrLoc\ (\{\{a\}\})$

```
source: address
dialed: SString
target: address
currentZone: zone
route: zonePlaceholder∪seq boxZone
placingBox: FBoxType
```
where
    zone ::= source | dialed | target zonePlaceholder ::= sourceZone | dialZone | targetZone | targetZoneSuffix

530 — STEP 3: ADVANCE ZONE

531 — • If route =<> and currentZone = source, then let currentZone = dialed and route = dialedZone, and go to Step 2.

532 — • If route =<> and currentZone = dialed, then let currentZone = target and route = targetZone, and go to Step 2.

Fig. 5C

540 — STEP 4: CHOOSE BOX

541 — If the route is not empty, remove its head element (t,z), and use it to choose a box b as follows:

542 — (4a) If t ∈ FFBoxType, then b is any available box of type t.

543 — (4b) If t ∈ BFBoxType, then b is the box of type t such that boundTo(b) = source if z = source and such that boundTo(b) = target if z = target. The existence of such a box is guaranteed by DFC constraints.

544 — If the route is empty, route to a box b according to the value of target as follows:

545 — (4c) If target ∈ LAddress, then b is LMap(target).

546 — (4d) If target ∈ TAddress, then b is any box such that b TMap ({target}).

547 — (4e) If target ∈ RAddress, then b is any box such that b RMap ({target}).

548 — (4f) Else b is any available Routing Error box. These are free feature boxes, available everywhere.

ROUTING OPTIMIZATIONS FOR TELECOMMUNICATIONS NETWORK SYSTEM AND METHOD

CROSS REFERENCE TO RELATED APPLICATIONS

This application claims priority to United States Provisional Applications "Routing Optimizations for Telecommunications Network System and Method," Ser. No. 60/255,590, filed on Dec. 14, 2000, the contents of which are incorporated by reference herein.

REFERENCED-APPLICATIONS

This application is related to Utility Applications, "Telecommunication Network System and Method," Ser. No. 09/034,681, filed on Mar. 4, 1998; "Routing Extensions For Telecommunications Network System And Method," Ser. No. 09/644,128, filed Aug. 23, 2000; "Protocol Extensions For Telecommunications Network Systems and Method," Ser. No. 09/644,461, filed Aug. 23, 2000; and "Signaling/Media Separation for Telecommunication Network System and Method," Ser. No. 09/716,102, filed on Nov. 17, 2000; which are incorporated by reference herein.

BACKGROUND OF INVENTION

The invention relates to telecommunications networks, and more particularly to advanced architectures for the description of telecommunication services.

The feature-interaction problem arises from the incremental, feature-by-feature, extension of telecommunications system functionality. As new features such as call forwarding, call waiting, or three-way calling have been added to telecommunication systems, it has become increasingly difficult to manage the behavioral complexity of the features and their interactions. Redesign of old features to fit smoothly with the new features is scarcely ever a practical option. Eventually, the resulting complexity damages the quality and productivity of all phases of telecommunication software development.

In the pending utility application, "Telecommunication System and Method," Ser. No. 09/034,681, filed on Mar. 4, 1998, which is incorporated by reference herein, the inventors introduced an architecture for managing the feature-interaction problem. The inventors presented a virtual architecture for telecommunication systems, which they called distributed feature composition (DFC), in which a feature corresponds to a component type; each telephone call is handled by building a configuration of instances of these components, according to the features to be applied to that particular call. The feature component instances communicate by featureless internal calls that are connected by the underlying architectural substrate. A new feature is specified by describing its corresponding component type (or occasionally, two component types) and the rules for including the component instances into configurations. In the pending utility applications, "Routing Extensions For Telecommunications Network System And Method," Ser. No. 09/644,128, filed Aug. 23, 2000, and "Protocol Extensions For Telecommunications Network Systems and Method," Ser. No. 09/644,461, filed Aug. 23, 2000, "Signaling/Media Separation for Telecommunication Network System and Method," Ser. No. 09/716,102, filed on Nov. 17, 2000, which are incorporated by reference herein, the inventors enhanced and modified DFC to accommodate open telecommunication systems, mobile telecommunication users, multimedia telecommunication services, unified messaging, and other aspects of modern telecommunication systems and services.

As discussed in the above-mentioned pending applications, DFC "address data" is data in the distributed feature system associated directly with individual addresses. The location of this data is an important problem, for several reasons. Its size is directly proportional to the number of addresses in use, which means that a successful DFC-like network will have a large quantity of DFC address data to manage. DFC address data is used frequently by routers and feature boxes in the above schemes, so access to it should be quick. Finally, DFC address data is data that describes or belongs to customers, and is therefore subject to many concerns about security, privacy, and protection behind administrative boundaries.

SUMMARY OF INVENTION

A distributed features system is disclosed which permits a telecommunication network to efficiently distribute data related to network addresses. In accordance with an aspect of the invention, the routing scheme of the distributed feature system permits address data to be partitioned across a plurality of nodes such that the address data and feature modules subscribed to by the address data can be located at the same node. The routing algorithm can be designed so that—as a communication usage unfolds—it never requires the data or feature modules of more than one address at a time. A communication usage unfolds within the node where an address is located, adding its feature modules and using its slice of the routing data, until the need for this address is exhausted and a different address becomes relevant. The node consults a service which identifies the node at which is located the address data needed for the usage. Then, the usage can jump to the location of the new address and continue to unfold, ultimately assembling the modules in a usage that spans the different nodes. This approach advantageously requires only one copy of a slice of the address data in the distributed feature system. The routing in the distributed feature system always has local access to address-partitioned routing data, and all feature modules have local access to their address-partitioned operational data.

These and other aspects and advantages of the invention will be apparent to those of ordinary skill in the art by reference to the following detailed description and the accompanying drawings.

BRIEF DESCRIPTION OF DRAWINGS

FIG. 2 is a formal specification of relations between types and data in accordance with a preferred embodiment of the invention.

FIG. 3 is a formal representation of four location constraints.

FIG. 4 is an exemplary setup signal format for routing in the distributed feature system in accordance with a preferred embodiment of the invention.

FIGS. 5, 5A, 5B, and 5C are flowcharts illustrating a routing method for the distributed feature system in accordance with a preferred embodiment of the invention.

DETAILED DESCRIPTION

The present invention is directed to a solution in a distributed feature system, such as DFC, to the problem of address data that locates each address at one or more nodes. DFC as an abstract architecture has no concept of location. A concrete implementation of DFC must have a concept of location—specifically, of network nodes. The concept of a node can be added to the basic types of the formal specification of DFC data and routing, as set forth at 201 in FIG. 2. The specification utilizes the Z notation, as is known in the art. See, e.g., J. M. Spivey, "The Z Notation: A Reference Manual", Prentice-Hall International 1989, pages 95–109. In the Z specification set forth in FIG. 2, node is a type or set containing all network nodes participating in the distributed feature system. In the Z specification, address is a syntactic category. The addresses in use, none of which can be the empty string, are partitioned into four sets, as shown at 202 in FIG. 2. DFC address data consists of four collections. The first collection contains the mappings from addresses to interface boxes, as specified at 203 in FIG. 2. The second collection is the function from a bound feature box to the address to which it is bound, as specified at 204 in FIG. 2. The third collection indicates which addresses subscribe to which feature boxes in which zones, as specified at 205 in FIG. 2. Note that there are no bound feature boxes in the dialed zone. The fourth collection consists of operational data partitioned by adresses. In formal terms, these are members of dataRelation and opRelation. In practical terms, much operational data belongs to this aggregation.

The basic unit of data distribution is the address slice. The slice for address a includes all the tuples of LMap, TMap, RMap, boundto, and subscribes containing a, along with all the tuples of operational data relations whose search key is a.

The address data of the distributed feature system is located at one or more nodes. The solution relies on the fact that each box is located permanently at one network node. So that locations can be dealt with in the system, the following total functions mapping boxes and addresses to their node locations are introduced:

boxloc:($I$Box∪$F$Box)→node addrLoc: LAddress→node

Basically, in an implementation of the solution, the address slice, the subscribed feature boxes, and line interface of an address a are all located at the same node. In accordance with an aspect of the invention, the routing algorithm of the distributed feature system is restructured so that—as a usage unfolds—it never requires the data, interface box, or feature boxes of more than one address at a time. A usage unfolds within the node where an address is located, adding its boxes and using its slice of the routing data, until the need for this address is exhausted and a different address becomes relevant. Then the usage jumps to the location of the new address and continues to unfold.

Figure 1:
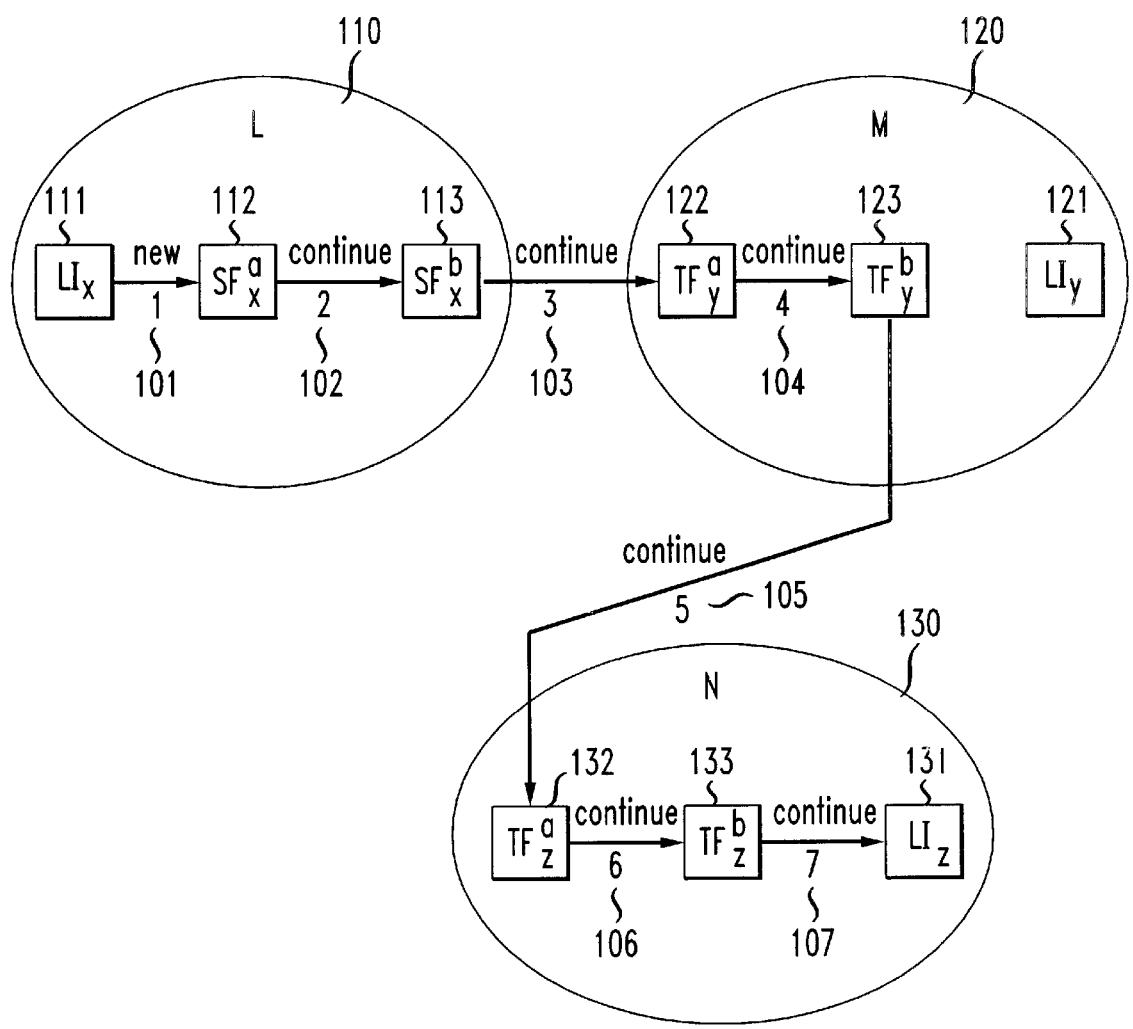
FIG. 1 is an abstract diagram of a communication usage in a distributed feature system, illustrating an aspect of the invention.

A simple example of this is shown in FIG. 1. Addresses x, y, and z are located at nodes L(110), M(120), and N(130) respectively. Internal calls 1 (101) and 2 (102) require only the routing data in the address slice of x, and route to boxes subscribed to by x. Internal call 4 (104) requires only the routing data in the address slice of y, and routes to a box subscribed to by y. Internal calls 6 (106) and 7 (107) require only the routing data in the address slice of z, and route to boxes of z. Internal calls 3 (103) and 5 (105) change the address focus of the usage, so they involve jumps from one node to another.

This approach is advantageous in that it requires only one copy of each address slice of the DFC address (except, of course, for purposes of backup). DFC routing always has local access to address-partitioned routing data, and all feature boxes have local access to their address-partitioned operational data.

This approach requires a global implementation of the function addrLoc upon which node-to-node jumps depend. The approach also requires the following constraints on box and address locations.

$\forall$a: LAddress. $\forall$b: $F$Box•b∈boundto•({a }→boxLoc(b)=addrloc(a)

$\forall$a: LAddress•boxloc(LMap(a))=addrLoc(a)

All the boxes bound to an address must be located at the same node as the address. The line interface to which an address refers must be located at the same node as the address.

LOCATION CONSTRAINTS. In general, an address might be located at more than one node. A member of TAddress might be reachable by multiple trunks attached to different nodes. A member of RAddress denotes a type of media resource, which might be represented by multiple instances at different nodes. A member of MAddress might map to multiple other addresses at different nodes, and possibly be co-located with all of them.

In its general form addrLoc is a relation:

addrLoc: address→node dom addrLoc=(LAddress∪TAddress∪RAddress∪MAddress)

In this context it is convenient to discuss the location set of a set of boxes. To do so, it is advantageous to use a form of boxLoc, named boxSetLoc, that is declared as a relation:

boxSetLoc: ($I$Box∪$F$Box)↔node boxSetLoc=boxLoc

FIG. 3 shows four location constraints based on addrLoc. First, the slice of an address must be available at every node where the address is located, as represented at 301. Second, any feature box bound to an address must be available at every node where the address is located. Since such a box is unique and immovable, it follows that an address with bound boxes must be located at a unique node, as represented at 302. Third, any free feature box type subscribed to by an address must be available at every node where the address is located, as represented at 303. Fourth, if an address maps to interface boxes (recall that members of MAddress do not), a suitable interface box must be available at every node where the address is located, as represented at 304.

ROUTING. The routing scheme disclosed in the above-mentioned co-pending patent applications is changed herein in a number of advantageous ways. The first change from the previous definition of DFC routing is a small one. Any telecommunication system, old or new, must deal with the possibility that a user's device and/or interface box has fewer signaling capabilities than the user currently needs. To give an extreme example, the signaling might not be directed to the features of this network—rather, it might be intended for another network that can be reached through this one. Clearly it cannot be expected that each network will support all signaling requested by all other networks.

The necessary extensibility and interoperability is often provided by allowing the user to encode signaling information in the dialed string. Accordingly, it is advantageous to support this as a built-in capability, not requiring the intervention of any feature box. The syntactic method for distinguishing the target address from encoded signaling information is formalized as the partial function, embeddedTarget: SString→address which finds the address in the dialed string if there is one. This partial function is now used in the first step of the routing algorithm, to obtain a target address. Feature boxes that actually use signaling information encoded in the dialed string must be able to decode it themselves.

For example, a dialed string in a particular implementation might take the form:

john.doe@eclipse?sec=high&mail=no.

In this string, the embedded target address is john.doe@eclipse. The remainder of the string encodes a sequence of key/value pairs that might be used as control signals by various features, or might even pass through the implementation unscathed to control another network.

The second change from the previous definition of DFC routing is also small: if a feature has box types that issue direct commands, then no address can subscribe, in the target zone, to more than one box type of that feature. Recall that the destination feature box type of a direct command must belong to the same feature as the box issuing the command. The new constraint allows the router to send a direct setup to any target-zone box belonging to the same feature as the issuing box. The issuing box does not need to name the actual box type being reached, which enhances modularity and makes the features easier to update.

The remaining changes constitute a major reorganization of DFC routing. Although these changes were motivated by the problem of address data in a practical implementation, and support the critical properties discussed herein, they improve distributed feature systems like DFC even in their most abstract form.

In the new routing scheme, the fact that a box program examines and creates setup signals through a programming interface is emphasized. This programming interface makes box programming easier by automating certain tasks, and also enforces architectural constraints. The specification of this programming interface is now part of the overall DFC routing scheme, as the various routing commands are now different calls to the programming interface.

Also in the new routing scheme, zones of the route can be represented by constants called zone placeholders. A zone placeholder is not expanded into a real zone (a sequence of boxZone pairs) until the real zone is needed. Thus expansion of zones is now lazy rather than eager. For example, consider the history of FIG. 1. In old DFC routing, the target zone of subscriber y would have been put in the route field during routing of internal call 1 (101). Now it is put in the route during routing of internal call 3 (103).

The new understanding of routing is based on sequences of related setup signals. A sequence begins with a setup signal created by a new command in the box that emits it. The sequence is extended whenever a DFC router changes the setup signal during routing, or whenever a box, having received a setup signal in the sequence as part of an incoming call, uses a non—new command in the programming interface to modify it for placing an outgoing call. The setup signals of all the internal calls in FIG. 1 are related in this way.

In the new routing scheme, a setup signal carries the currentzone (source, dialed, or target), which indicates which feature boxes are currently being routed to. It is a property of the new routing scheme that each sequence of related setup signals is partitioned into three subsequences: first a subsequence with currentZone=source, second a subsequence with currentZone=dialed, and third a subsequence with currentZone=target. This means that the only way a feature box routed to in one zone can cause routing to feature boxes of an earlier zone is by placing a call with a new setup signal, and thus starting a new sequence.

Also, there is no longer an update command. Instead of using update commands, box programmers simply use continue commands, and the routing algorithm determines if and when to alter the current route. This makes box programming easier and more modular (since box programmers rarely have to consider the effects of their box on the route), and helps enforce the constraints on sequences of related setup signals.

In FIG. 1, for example, feature box $TF_y^b$ (123) uses a continue command to prepare the outgoing setup signal, and also changes the value of targetfrom y to z. Because currentZone=target, the routing algorithm updates the target zone to that of z. If the same feature box had changed the value of source, on the other hand, it would have had no effect on routing. This is appropriate because a target-zone feature box changes source for the purpose of changing the caller identification, not for the purpose of invoking source-zone features. If a source-zone feature box changed the value of source, then of course the routing algorithm would update the route to contain those feature boxes subscribed to by the new source in the source zone.

The changes should not prevent features from doing useful things, but they should guarantee the absence of some anomalies. For example, it is no longer possible for a feature box to be routed to in the source (target) zone while its subscriber's address is not the current value of source (target).

Figures 4, 5:
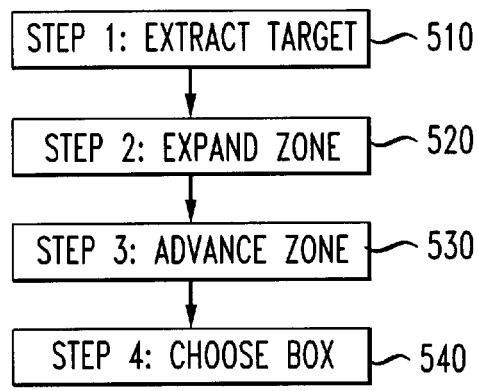

SETUP SIGNAL. FIG. 4 sets forth the fields and types of a setup signal, in accordance with an embodiment of the invention. An empty string can be used as a null value in a source, dialed, or target field. In any setup signal, the values of currentZone and route must be consistent. For example, if the value of currentZone is source then the value of route must either be sourceZone or a sequence of pairs, each having the form (b, source).

A box program examines an incoming setup signal or creates an outgoing setup signal through a programming interface. This interface enforces constraints on the box program, including which fields the program can examine and what form the setup signal can take.

The only fields of an incoming setup signal that a box program can examine are the source, dialed, target, and currentZone fields. Note that a box can use these methods to determine its own subscriber. For example, if the value of currentZone is target, then the box's subscriber's address is the value of target.

The effect of a new routing command is achieved in a box by evaluating a newSetupSignal function with required source, dialed, and target arguments. The value of newSetupSignal is a setup signal with source, dialed, and target fields having the values supplied by the arguments, and currentZone=source route=sourceZone placingBox value is irrelevant Note that an interface box can only issue new setup signals. In each such signal, the value of source must be an address of the interface box.

After an interface box issues a newsetup signal, the simplest usages unfold without further intervention by box programmers; each feature box simply makes an outgoing call using the same setup signal that it received in an incoming call.

Box programmers can alter routing in a usage, however, as follows. A box program commanding continue must have received an incoming setup signal upon which the new one will be based. The box programmer chooses whether to modify the values of its source, dialed, or target fields, and evaluates a function continueSetupsignal with a required setupSignal argument and optional source, dialed, and target arguments. The value of continueSetupSignal is a modified setup signal. Whichever of source, dialed, and target are not supplied as arguments are copied from the old setup signal to the new. The currentZone field is also copied. The route field is copied, with the following changes:

- If currentZone=source and source has been changed from the old setup signal, then replace the old value of route by sourceZone.
- If currentZone=dialed and dialed has been changed from the old setup signal, then replace the old value of route by dialedZone.
- If currentZone=target and target has been changed from the old setup signal, then replace the old value of route by targetzone.

The function also supplies the value of the placingBox field, which is irrelevant.

A box program commanding direct must have received an incoming setup signal upon which the new one will be based. The box programmer chooses whether to modify the values of its source, dialed, or target fields, and evaluates a function directSetupSignal with a required setupsignal argument and optional source, dialed, and target arguments. The value of directSetupSignal is a modified setup signal. Whichever of source, dialed, and target are not supplied as arguments are copied from the old setup signal to the new. The function supplies the values of the other fields, which are:

currentZone=target route=targetZoneSuffix placingBox=b where b is the type of the feature box in which the setup signal is being prepared. The feature supported by b cannot have multiple target-zone boxes subscribed to by the same address:

∀f:feature, c: FBoxType, d: FBoxType●

(providesFeature(b)=f proividesFeature(c)=f providesFeature(d)= f^c≠d)→

(→∈a: address●(c,target)∈subscribes ([(a)˜](d,target)∈subscribes ({a}))

ROUTING ALGORITHM. FIG. 5 is a flowchart illustrating the new routing algorithm for the distributed feature system, in accordance with an embodiment of the invention. At step 1 of the routing algorithm, shown as 501 in FIG. 1, the target is extracted. On receiving a setup signal, a DFC router first examines the dialed and target fields. If target contains a null value and the value of dialed is in the domain of embeddedTarget, then the router sets target in the setup signal to the value of embeddedTarget(dialed).

Figure 5A:
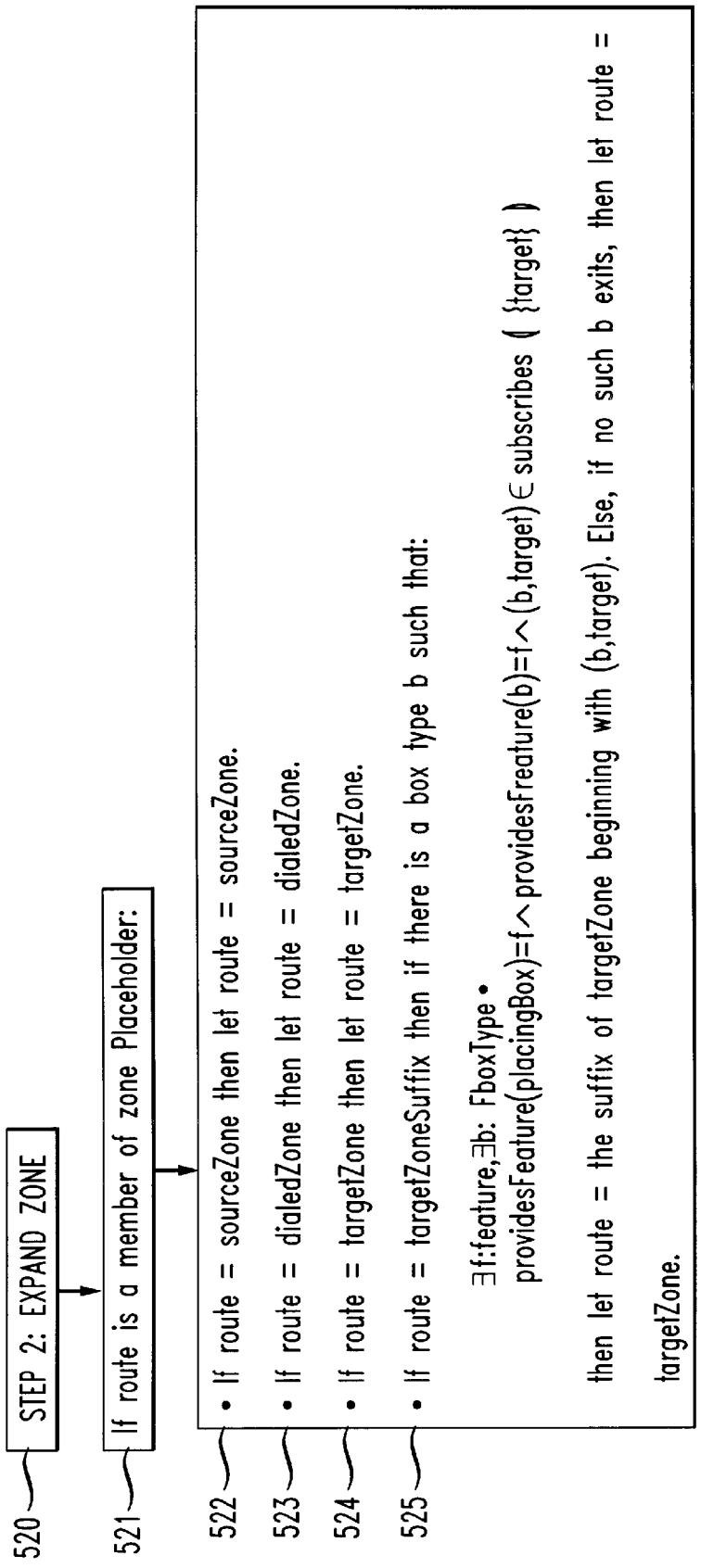

At step 2 of the routing algorithm, shown as 502 in FIG. 5, zone placeholders are expanded, as illustrated in greater detail by the flowchart shown in FIG. 5A. For a given setup signal, the following values are defined:

sourceSet=subscribes ({source})▷(source)
targetSet=subscribes ((target)}▷(target)
dialedSet=dialedTrigger ((dialed) ⟩×{dialed}

All of the values are of type:

P (FBoxType×zone):

The expression subscribes ({source})

yields the set of all members of boxZone to which the address in source subscribes.

The operator

▷{source} gets rid of all the members of boxZone referring to the target zone, leaving a set of pairs of the form (FBoxType, source) as the value of sourceSet. The feature box types in this set are those to which the source address subscribes in the source zone.

Furthermore, sourceZone is a sequence with the same membership as sourceSet and ordered in agreement with the partial order in precedence. targetzone is a sequence with the same membership as targetSet and ordered in agreement with the partial order in precedence. dialedZone is a sequence with the same membership as dialedSet and ordered in agreement with the partial order in precedence.

Figure 5B:
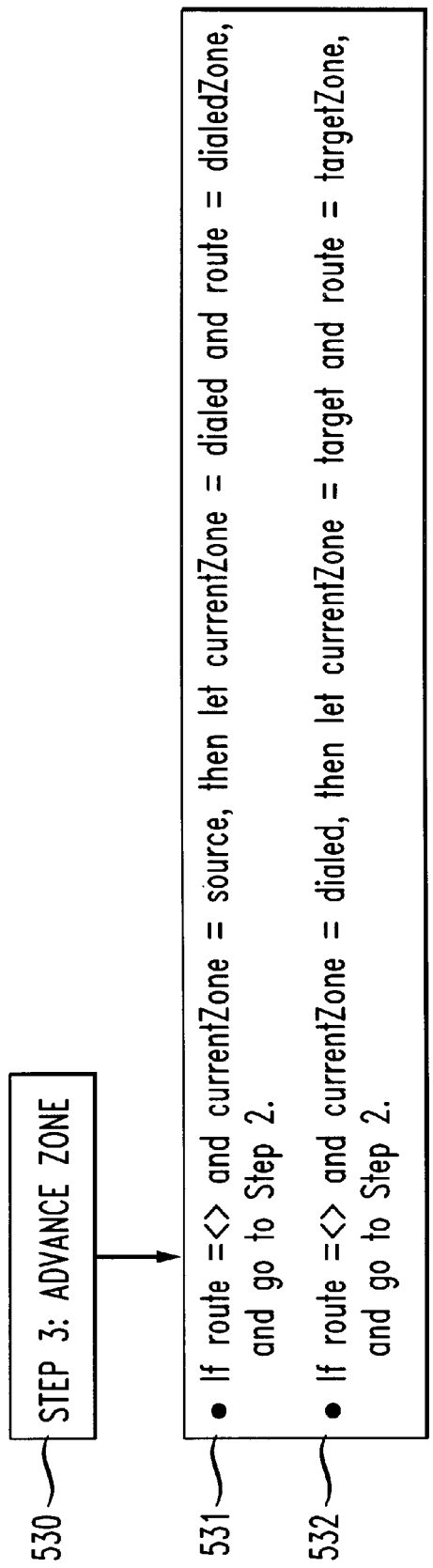

At step 3 of the routing algorithm, the zone is advanced, as shown as 530 in FIG. 5 and in greater detail in the flowchart in FIG. 5B. At step 4 of the routing algorithm, a box in the distributed feature system is chosen. This step is shown as 540 in FIG. 5 and in greater detail in the flowchart in FIG. 5C.

Figure 6:
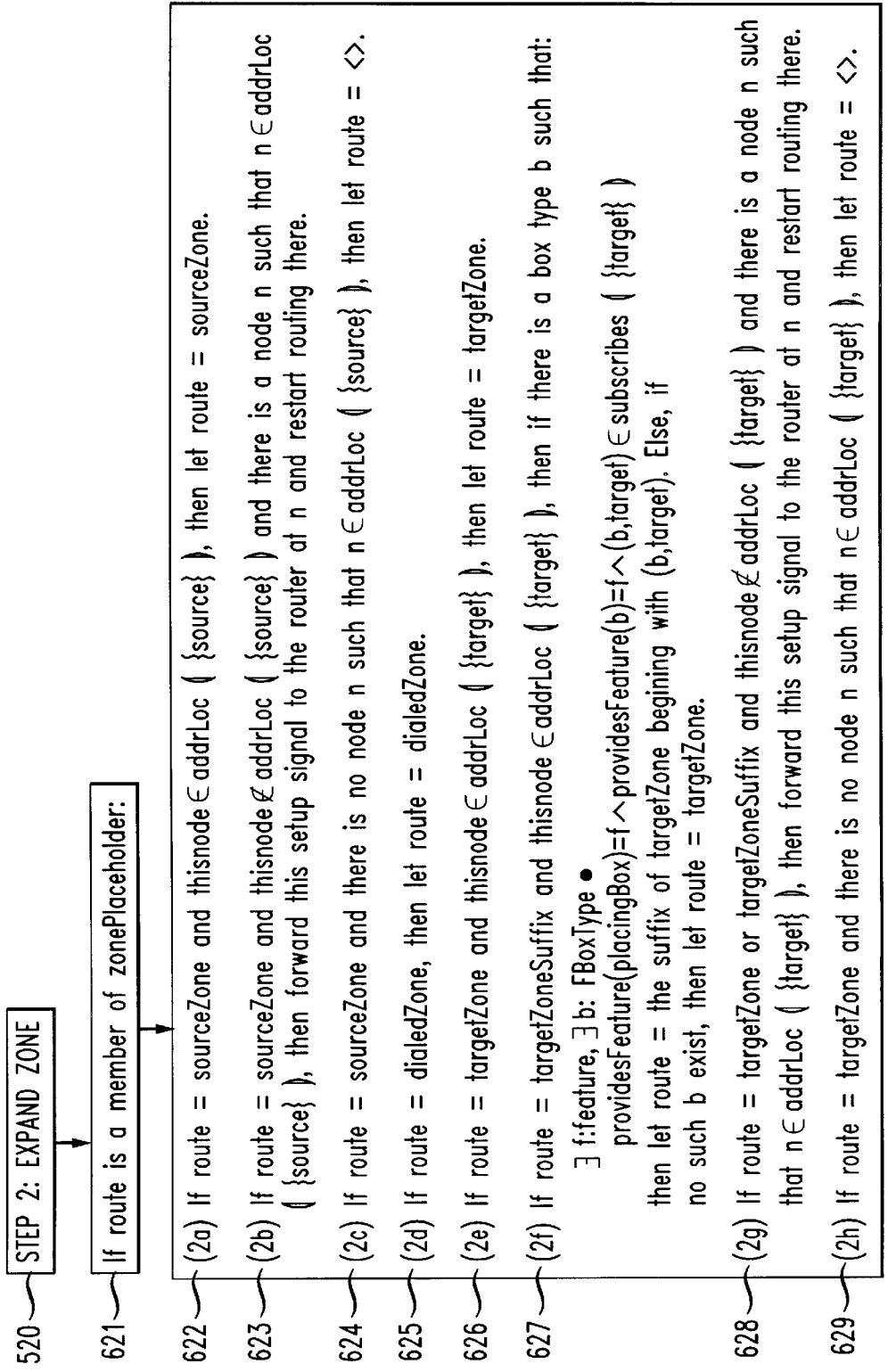
FIG. 6 is a flowchart illustrating an implementation of the routing method for the distributed feature system in accordance with a preferred embodiment of the invention.

The above routing algorithm can be augmented for a distriuted feature system instantiation for packet switched networks. Assume there is a router running at every participating network node and that the router for a node has access to DFC address data as decribed above. The management of other data is not constrained here. In addition, the system has a global implementation of the relation addrLoc. When a box wishes to place a DFC internal call, it sends the setup signal to the router at the node where the box is located. That router (possibly in cooperation with other routers) processes the setup signal by performing the four steps of the DFC routing algorithm, as described above. In particular, step 2 of the routing algorithm can be implemented as shown in FIG. 6.

The routing algorithm can be shown to guarantee a number of important properties, for example that routing always terminates, and that address slices and feature boxes are present locally whenever they are needed. It can be shown that, in any setup signal, the value of route (whether zone placeholderor expanded zone) refers to the same zone as the value of currentZone. It can also be shown that, if a router requires address-partitioned routing data, then that data is available at the node where the router is located. It can also be shown that, if a router needs to route a DFC internal call to a box, then the box is available at the node where the router is located. It can also be shown that, if a feature box needs access to address-partitioned operational data, then that data is available at the node where the box is located. It can also be shown that each routing phase terminates.

ADDRESSES WITH MULTIPLE LOCATIONS. The location constraint 302 in FIG. 3 says that an address to which boxes are bound can only be located at the unique node where its bound boxes reside. Location constraint 304 in FIG. 3 says that an address must be located at every node with an interface box to which it maps. These constraints can conflict, can allow an address to be located at multiple nodes, or can even require an address to be located at multiple nodes. This section discusses the practical consequences for different types of address.

Members of TAddress. It is possible for a member of TAddres to have interface boxes at multiple nodes. This would happen if some addresses are reachable through two different trunk groups, with endpoints at two different nodes of our network. If such an address subscribes to a bound feature box, there is a conflict between constraints 302 and 304.

Figure 7:
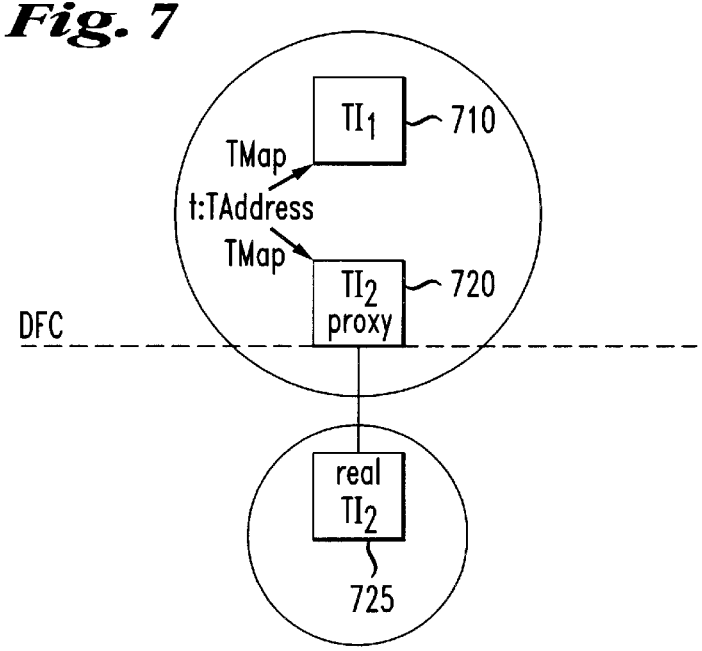
FIG. 7 is a diagram illustrating how to move an address conflict outside DFC.

The conflict situation can be prohibited, or it can be moved outside the part of the network described in DFC. To achieve the latter, one of the two trunk-group nodes must be chosen as the location of the address. See FIG. 7. This node has all the boxes bound to the address and twoTI boxes. $TI_1$ (710) is a normal trunk-group endpoint.

$TI_2$ (720) at this node is a proxy through which the trunk-group endpoint in the other node (725) can be reached. The connection between the proxy and the real $TI_2$ has no counterpart in DFC. Whether this solution works well or not depends on whether the media layer can be managed to avoid unnecessary media hairpins through the upper node on the way to the lower node.

Members of RAddress. It is normal for a member of RAddress to have interface boxes at many nodes, because a member of RAddress designates a type of media resource. If the type is a commonly used one, such as an announcement server, it should be available at nearly every node. Thus, according to constraint 304, it is normal for an RAddress to be located at many nodes.

Fortunately, this is unlikely to cause problems. The address of a commonly used resource would never subscribe to bound feature boxes, so there will be no conflict between constraints 302 and 304.

Resource type $r_1$ might subscribe to a free feature box that retargets certain resource requests to resource types $r_2$ and $r_3$. (Perhaps $r_2$ and $r_3$ are newer resource types which were not known to programmers of older feature boxes.) The address mapping is feature operational data in the slice of address $r_1$, and must therefore be available at each node with a resource interface of type $r_1$. Fortunately, even if such data is allowed by a network, it is owned by the system and never changed except by provisioning. The provisioned data in the address slice of $r_1$ can simply be replicated wherever it is needed.

Members of Maddress. A member of MAddress subscribing to bound feature boxes must be located at a single node. If a member of MAddress subscribes to no bound feature boxes, on the other hand, its locations are completely unconstrained by the rules described above. Of course, one can simply ignore the special characteristics of such truly mobile addresses and locate each one at a unique node. Before settling on this, however, consider the following realistic example.

Figure 8:
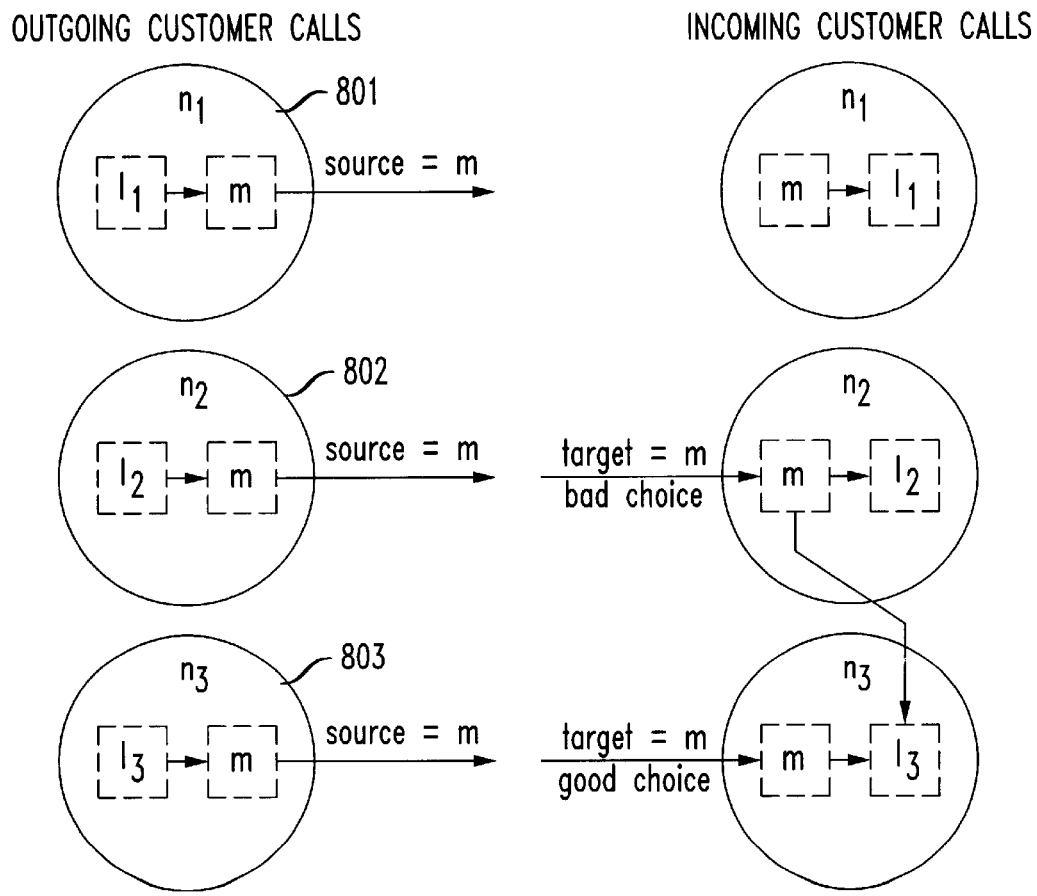
FIG. 8 is a diagram illustrating usage of a truly mobile address m.

Consider a mobile address m used to locate a subscriber at any one of his devices at line addresses $I_1$, $I_2$, and $I_3$, located at nodes $n_1$ (801), $n_2$ (802), and $n_3$ (803) respectively, as shown in FIG. 8. A dotted box denotes a subusage containing one or more feature boxes subscribed to by the given address. Address m subscribes to a location feature whose operational data contains the currently preferred line address for reaching the subscriber.

As shown in FIG. 8, a typical customer call placed from one of the subscriber's devices invokes source-zone features of the line address, followed by source-zone features of m. Typical source-zone features of a mobile address might be "Get Mail" or "Personalized Dialing". A typical target-zone feature of a mobile address, in addition to Location, might be "Record Mail". A typical customer call directed to m invokes target-zone features of m, followed by target-zone features of one of the line addresses. The operational data in the address slice of m may be large and may change frequently.

Besides giving m a unique node location, there are at least two other possible strategies. The first strategy is to locate m at all three relevant nodes. (This is the strategy actually illustrated by FIG. 8.) On each outgoing customer call, the boxes and data of m are available at the same node where the call begins, thus avoiding potential hairpins in both signaling and media paths.

To make this strategy work, one must develop the capability to keep multiple local copies of mutable address data up-to-date and synchronized. Furthermore, one must deal with the problem shown on the incoming side of FIG. 8. The system locates m at $n_1$, $n_2$, and $n_3$. When the implementation of addrLoc is being invoked for m, which location should it choose? If the operational data of m currently locates the subscriber of m at node $n_3$, then $n_3$ is the best-choice. Possibly the implementation of addrLoc can be augmented to take optional advice from feature boxes on this choice.

The second alternate strategy is to centralize the address slice of m, on the grounds that it will then be accessible with equal latency from any node. To make this strategy work, one must determine how routers and feature boxes distinguish between address slices available locally and address slices that are centralized.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented in. the context of DFC; however, the principles of the present invention could be extended to distributed feature architectures. Such an extension could be readily implemented by one of ordinary skill in the art given the above disclosure.

What is claimed is:

1. A telecommunication network system comprising:
   (a) a plurality of nodes wherein address data and feature modules subscribed to by the address data are located at the same node;
   (b) means for identifying a node based on the address data located at the node; and
   (c) means for establishing communication channels between the nodes such that the feature modules at different nodes are capable of being assembled into a graph spanning the nodes such that the assembled feature modules implement features for a communication usage, each feature module being independent and communicating with other feature modules through featureless internal calls through the network,
   wherein a communication from an originating customer to a destination is routed through the assembled feature modules such that the communication includes all features associated with a request by the originating customer.

2. The invention of claim 1 wherein the address data associates an address with an external line or trunk at the node.

3. The invention of claim 2 wherein one or more addresses are mobile addresses which are not permanently associated with an external line or trunk and wherein feature modules can be subscribed to by the mobile addresses.

4. The invention of claim 2 wherein an address may be a source or a target of the communication usage and can be changed by the feature modules implementing features for the communication usage.

5. The invention of claim 1 wherein operational data required by the feature modules at a node is located at the same node as the feature modules.

6. A method of operating a telecommunication network system comprising the steps of:
  (a) receiving at a first node a setup request for a communication usage requiring application of a feature;
  (b) identifying a second node at which is located address data which subscribes to a feature module at the second node implementing the required feature;
  (c) routing the setup request to the second node wherein the feature modules at the first and second nodes are capable of being assembled into a graph spanning the nodes such that the assembled feature modules implement features for the communication usage, each feature module being independent and communicating with other feature modules through featureless internal calls through the network,
  wherein a communication from an originating customer to a destination is routed through the assembled feature modules such that the communication includes all features associated with a request by the originating customer.

7. The invention of claim 6 wherein the address data associates an address with an external line or trunk at the node.

8. The invention of claim 7 wherein one or more addresses are mobile addresses which are not permanently associated with an external line or trunk and wherein feature modules can be subscribed to by the mobile addresses.

9. The invention of claim 7 wherein an address may be a source or a target of the communication usage and can be changed by the feature modules implementing features for the communication usage.

10. The invention of claim 6 wherein operational data required by the feature modules at a node is located at the same node as the feature modules.

11. The invention of claim 6 wherein the setup message specifies a route containing a placeholder which is not expanded until needed.

* * * * *